US012640087B2

(12) United States Patent
Jeong et al.

(10) Patent No.: US 12,640,087 B2
(45) Date of Patent: May 26, 2026

(54) PIXEL CIRCUIT AND DISPLAY DEVICE INCLUDING THE PIXEL CIRCUIT

(71) Applicant: Samsung Display Co., LTD., Yongin-si (KR)

(72) Inventors: Keuk-Jin Jeong, Yongin-si (KR); Wongyun Kim, Yongin-si (KR); Min Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/886,849

(22) Filed: Sep. 16, 2024

(65) Prior Publication Data

US 2025/0104612 A1 Mar. 27, 2025

(30) Foreign Application Priority Data

Sep. 25, 2023 (KR) ........................ 10-2023-0128123

(51) Int. Cl.
*G09G 3/32* (2016.01)
*G09G 3/3233* (2016.01)

(52) U.S. Cl.
CPC ............ *G09G 3/32* (2013.01); *G09G 3/3233* (2013.01); *G09G 2300/0852* (2013.01); *G09G 2320/0233* (2013.01)

(58) Field of Classification Search
CPC ... G09G 3/32–3291; G09G 2300/0809; G09G 2300/0819; G09G 2300/0842;
(Continued)

(56) References Cited

U.S. PATENT DOCUMENTS 11,842,677 B1 * 12/2023 Hsiao .................. G09G 3/3233
12,417,735 B2 * 9/2025 Jeong .................. G09G 3/3233
(Continued)

FOREIGN PATENT DOCUMENTS

CN 109785800 A 5/2019
JP 2021128194 A 9/2021

OTHER PUBLICATIONS

Kei Kimura et al., "New pixel driving circuit using self-discharging compensation method for high-resolution OLED micro displays on a silicon backplane", Journal of the SID 25/3, 2017, (10 pages).

*Primary Examiner* — Nathan Danielsen
(74) *Attorney, Agent, or Firm* — CANTOR COLBURN LLP

(57) ABSTRACT

A pixel circuit includes a light emitting element including an anode electrode and a cathode electrode configured to receive a second power voltage, a driving transistor including a gate electrode connected to a first node, a first electrode connected to a second node, and a second electrode connected to a third node, a compensation transistor including a gate electrode configured to receive a compensation gate signal, a first electrode configured to receive a ground voltage, and a second electrode connected to the third node, a data write transistor including a gate electrode configured to receive a data write gate signal, a first electrode connected to a data line, and a second electrode connected to the first node, a first light emission control transistor, a first electrode configured to receive a first power voltage, and a second electrode connected to the second node, a storage capacitor, and a hold capacitor.

20 Claims, 20 Drawing Sheets

(58) Field of Classification Search
CPC ... G09G 2300/0852; G09G 2300/0861; G09G 2310/0243; G09G 2310/0251; G09G 2310/06; G09G 2310/08; G09G 2320/0209–0219; G09G 2320/0233; G09G 2320/0242
See application file for complete search history.

(56) References Cited

U.S. PATENT DOCUMENTS

| | | | | |
|---|---|---|---|---|
| 2016/0055792 | A1* | 2/2016 | Lee | G09G 3/3233 315/173 |
| 2018/0151115 | A1* | 5/2018 | Tseng | G09G 3/3233 |
| 2018/0293939 | A1* | 10/2018 | Kim | G09G 3/3233 |
| 2019/0103054 | A1* | 4/2019 | Chang | G09G 3/3233 |
| 2022/0012453 | A1* | 1/2022 | Choi | G09G 3/3233 |
| 2024/0046871 | A1* | 2/2024 | Chung | G09G 3/3275 |

* cited by examiner

PIXEL CIRCUIT AND DISPLAY DEVICE INCLUDING THE PIXEL CIRCUIT

This application claims priority to Korean Patent Application No. 10-2023-0128123, filed on Sep. 25, 2023, and all the benefits accruing therefrom under 35 U.S.C. § 119, the content of which in its entirety is herein incorporated by reference.

BACKGROUND

1. Field

Embodiments supported by aspects of the present disclosure relate to a pixel circuit and a display device including the pixel circuit.

2. Description of the Related Art

Generally, a display device may include a display panel and a display panel driver. The display panel may include gate lines, data lines, emission lines and pixel circuits. The display panel driver may include a gate driver for providing a gate signal to the gate lines, a data driver for providing a data voltage to the data lines, an emission driver for providing an emission signal to the emission lines, and a driving controller for controlling the gate driver, the data driver and the emission driver.

Recently, display devices which may be capable of providing a virtual reality (VR) or an augmented reality (AR) have been gaining prominence. For this purpose, target specifications for the display devices may include a small area and a high PPI (Pixels Per Inch). In this case, since the pitch occupied by a pixel circuit is narrowed, the narrowing of the pitch may limit the number of transistors constituting the pixel circuit and signals applied to the pixel circuit.

In some aspects, as the PPI increases, a data range of a data voltage may decrease. That is, as the PPI increases, a luminance accuracy according to a change of the data voltage may relatively decrease.

SUMMARY

Embodiments of the present disclosure provide a pixel circuit having a small area and a high PPI.

Embodiments supported by aspects of the present disclosure provide a display device including the pixel circuit.

In an embodiment of a pixel circuit according to aspects of the present disclosure, the pixel circuit includes a light emitting element including an anode electrode and a cathode electrode, wherein the cathode electrode is configured to receive a second power voltage, a driving transistor including a gate electrode connected to a first node, a first electrode connected to a second node, and a second electrode connected to a third node, a compensation transistor including a gate electrode configured to receive a compensation gate signal, a first electrode configured to receive a ground voltage, and a second electrode connected to the third node, a data write transistor including a gate electrode configured to receive a data write gate signal, a first electrode connected to a data line configured to provide a reference voltage or a data voltage, and a second electrode connected to the first node, a first light emission control transistor including a gate electrode configured to receive the compensation gate signal, a first electrode configured to receive a first power voltage, and a second electrode connected to the second node, a storage capacitor including a first electrode connected to the second node and a second electrode connected to the first node, and a hold capacitor including a first electrode configured to receive the ground voltage and a second electrode connected to the second node.

In an embodiment, the compensation transistor may be an N-type transistor and the first light emission control transistor may be a P-type transistor.

In an embodiment, the compensation transistor and the first light emission control transistor may form a complementary metal-oxide-semiconductor (CMOS) transistor.

In an embodiment, the pixel circuit may further include a second light emission control transistor including a gate electrode configured to receive an emission signal, a first electrode connected to the third node, and a second electrode connected to the anode electrode.

In an embodiment, the driving transistor and the data write transistor may P-type transistors, and the second light emission control transistor may be an N-type transistor.

In an embodiment, in a first period, the compensation gate signal and the data write gate signal may have a low voltage level, the emission signal may have a high voltage level, and the data line may be configured to provide the reference voltage.

In an embodiment, in the first period, the data write transistor may be configured to provide the reference voltage to the gate electrode of the driving transistor.

In an embodiment, in a second period after the first period, the compensation gate signal and the emission signal may have the high voltage level, the data write gate signal may have the low voltage level, and the data line may be configured to provide the reference voltage.

In an embodiment, in the second period, the compensation transistor is turned on, and the storage capacitor may store a threshold voltage of the driving transistor.

In an embodiment, in a third period after the second period, the compensation gate signal and the emission signal may have the high voltage level, the data write gate signal may have the low voltage level, and the data line may be configured to provide the data voltage.

In an embodiment, in the third period, the data write transistor may be configured to provide the data voltage to the gate electrode of the driving transistor.

In an embodiment, in the third period, the storage capacitor and the hold capacitor may distribute a voltage of the gate electrode of the driving transistor.

In an embodiment, in a fourth period after the third period, the compensation gate signal and the emission signal may have the low voltage level, the data write gate signal may have the high voltage level, and the data line may be configured to provide the reference voltage.

In an embodiment, in the fourth period, a driving current of the driving transistor may flow to the light emitting element.

In an embodiment, the pixel circuit may further include a second light emission control transistor including a gate electrode configured to receive the data write gate signal, a first electrode connected to the third node, and a second electrode connected to the anode electrode.

In an embodiment, the data write transistor may an N-type transistor and the second light emission control transistor may be a P-type transistor.

In an embodiment, the data write transistor and the second light emission control transistor may form a CMOS transistor.

In an embodiment of a display device according to the aspects supported by the present disclosure, the display device includes a display panel including a pixel circuit and a display panel driver configured to drive the display panel. The pixel circuit includes a light emitting element including an anode electrode and a cathode electrode, wherein the cathode electrode is configured to receive a second power voltage, a driving transistor including a gate electrode connected to a first node, a first electrode connected to a second node, and a second electrode connected to a third node, a compensation transistor including a gate electrode configured to receive a compensation gate signal, a first electrode configured to receive a ground voltage, and a second electrode connected to the third node, a data write transistor including a gate electrode configured to receive a data write gate signal, a first electrode connected to a data line configured to provide a reference voltage or a data voltage, and a second electrode connected to the first node, a first light emission control transistor including a gate electrode configured to receive the compensation gate signal, a first electrode configured to receive a first power voltage, and a second electrode connected to the second node, a storage capacitor including a first electrode connected to the second node and a second electrode connected to the first node, and a hold capacitor including a first electrode configured to receive the ground voltage and a second electrode connected to the second node.

In an embodiment, the pixel circuit may further include a second light emission control transistor including a gate electrode configured to receive an emission signal, a first electrode connected to the third node, and a second electrode connected to the anode electrode.

In an embodiment, the pixel circuit may further include a second light emission control transistor including a gate electrode configured to receive the data write gate signal, a first electrode connected to the third node, and a second electrode connected to the anode electrode.

According to the pixel circuit and the display device including the pixel circuit, since some of the transistors included in the pixel circuit may be N-type transistors, a leakage current of the pixel circuit may be minimized. Since the compensation transistor and the first light emission control transistor form the CMOS transistor, an area of the pixel circuit may be reduced. Since the driving transistor operates as a source-follower, a threshold voltage of the driving transistor may be compensated. Since a voltage at the first electrode of the driving transistor is distributed by the storage capacitor and the hold capacitor, a data range may be expanded. Since the second light emission control transistor is turned off in a non-emission period excluding a light emission period, light emission by the light emitting element due to leakage current flowing into the light emitting element may be prevented.

BRIEF DESCRIPTION OF THE DRAWINGS

The above and other features of embodiments supported by aspects of the present disclosure will become more apparent by describing in detailed embodiments thereof with reference to the accompanying drawings, in which.

DETAILED DESCRIPTION

Figure 1:
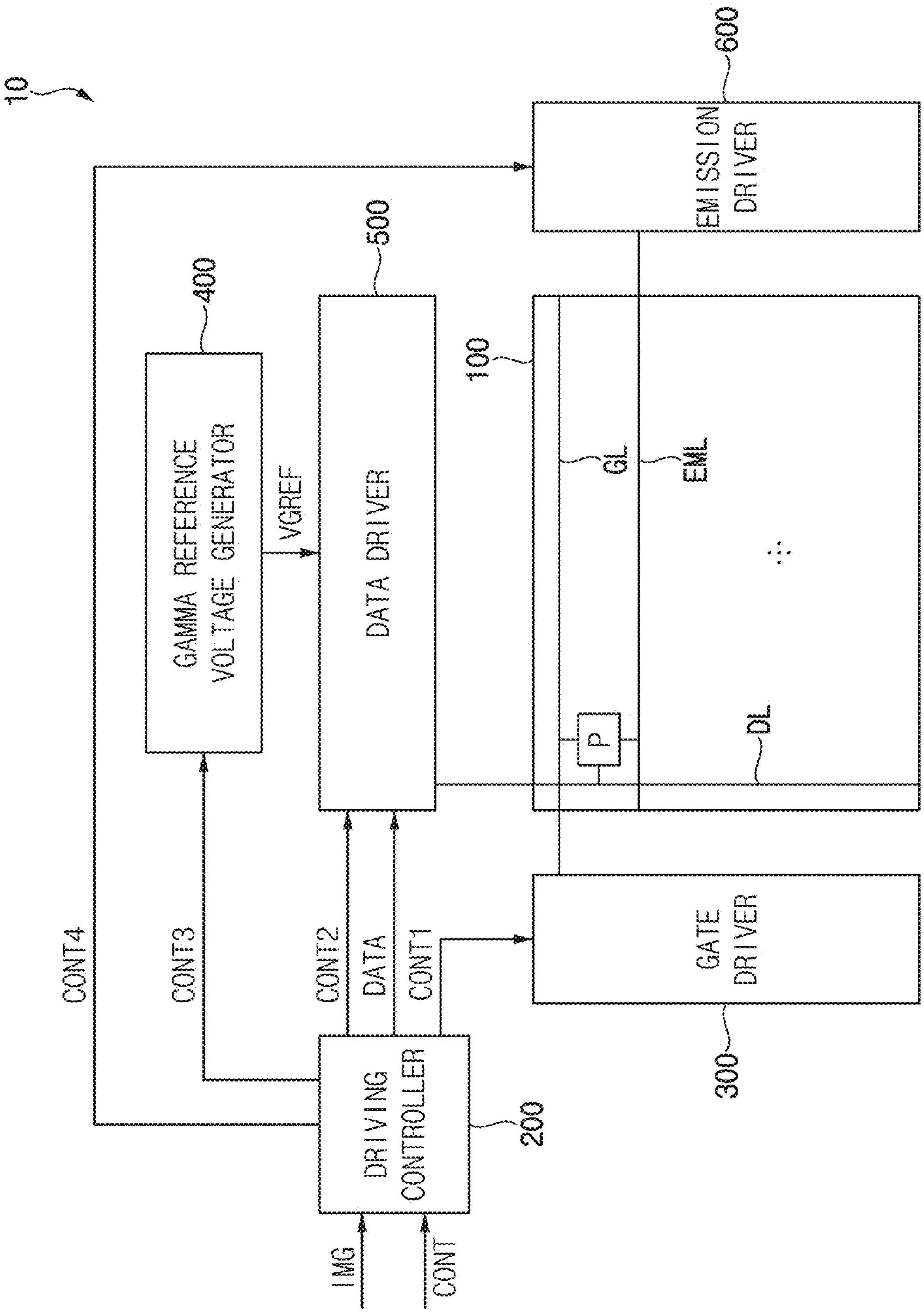
FIG. 1 is a block diagram illustrating a display device according to embodiments supported by aspects of the present disclosure.

Embodiments supported by the present disclosure will now be described more fully hereinafter with reference to the accompanying drawings, in which one or more example embodiments are illustrated. Aspects supported by the present disclosure may, however, be embodied in different forms and should not be construed as limited to the embodiments set forth herein. Rather, these example embodiments are provided so that this disclosure will be thorough and complete, and will fully convey the scope of example aspects of the invention to those skilled in the art.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The term "substantially," as used herein, means approximately or actually. The term "substantially equal" means approximately or actually equal. The term "substantially the same" means approximately or actually the same. The term "substantially identical" means approximately or actually identical. The term "substantially perpendicular" means approximately or actually perpendicular.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Embodiments are described herein with reference to cross section illustrations that are schematic illustrations of example embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

Hereinafter, the present disclosure will be described in more detail with reference to the accompanying drawings.

FIG. 1 is a block diagram illustrating a display device according to embodiments supported by aspects of the present disclosure.

Referring to FIG. 1, a display device 10 may include a display panel 100 and a display panel driver. The display panel driver may include a driving controller 200, a gate driver 300, a gamma reference voltage generator 400, a data driver 500, and an emission driver 600.

In an example, the driving controller 200 and the data driver 500 may be integrally formed. In an example, the driving controller 200, the gamma reference voltage generator 400 and the data driver 500 may be integrally formed. In an example, the driving controller 200, the gate driver 300, the gamma reference voltage generator 400 and the data driver 500 may be integrally formed. In an example, the driving controller 200, the gate driver 300, the gamma reference voltage generator 400, the data driver 500 and the emission driver 600 may be integrally formed. A driving module in which at least the driving controller 200 and the data driver 500 are integrally formed may be referred to as a timing controller embedded data driver (TED).

The display panel 100 may include a display region for displaying an image and a peripheral region disposed adjacent to the display region.

In an example, in the present embodiment, the display panel 100 may be an organic light emitting diode display panel including an organic light emitting diode. For example, the display panel 100 may be a quantum-dot organic light emitting diode display panel including an organic light emitting diode and a quantum-dot color filter. For example, the display panel 100 may be a quantum-dot nano light emitting diode display panel including a nano light emitting diode and a quantum-dot color filter.

The display panel 100 may include gate lines GL, data lines DL, emission lines EML and pixel circuits P electrically connected to the gate lines GL, the data lines DL and the emission lines EML, respectively. The gate lines GL may extend in a first direction, the data lines DL may extend in a second direction crossing the first direction, and the emission lines EML may extend in the first direction.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and the driving controller 200 may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and the driving controller 200 may output the third control signal CONT3 to the gamma reference voltage generator 400.

The driving controller 200 may generate the fourth control signal CONT4 for controlling an operation of the emission driver 600 based on the input control signal CONT, and the driving controller 200 may output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated at the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an example, the gamma reference voltage generator 400 may be disposed in the driving controller 200 or may be disposed in the data driver 500.

The data driver 500 may receive the second control signal CONT2 and the data signal DATA from the driving controller 200, and the data driver 500 may receive the gamma reference voltage VGREF from the gamma reference voltage generator 400. The data driver 500 may convert the data signal DATA into a data voltage of an analog type (e.g., data voltage VDATA later described herein) using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In an embodiment, the emission driver 600 may be integrated into the peripheral region of the display panel 100. In an embodiment, the emission driver 600 may be mounted on the peripheral region of the display panel 100.

In FIG. 1, for convenience of explanation, the gate driver 300 may be disposed on a first side of the display panel 100 and the emission driver 600 may be disposed on a second side of the display panel 100. Although illustrated, example embodiments supported by the present disclosure are not limited thereto. For example, both the gate driver 300 and the emission driver 600 may be disposed on the first side of the display panel 100. In another example, both the gate driver 300 and the emission driver 600 may be disposed on both sides of the display panel 100. In another example, the gate driver 300 and the emission driver 600 may respectively be disposed on different sides of the display panel 100. For example, the gate driver 300 and the emission driver 600 may be formed integrally.

Figure 2A:
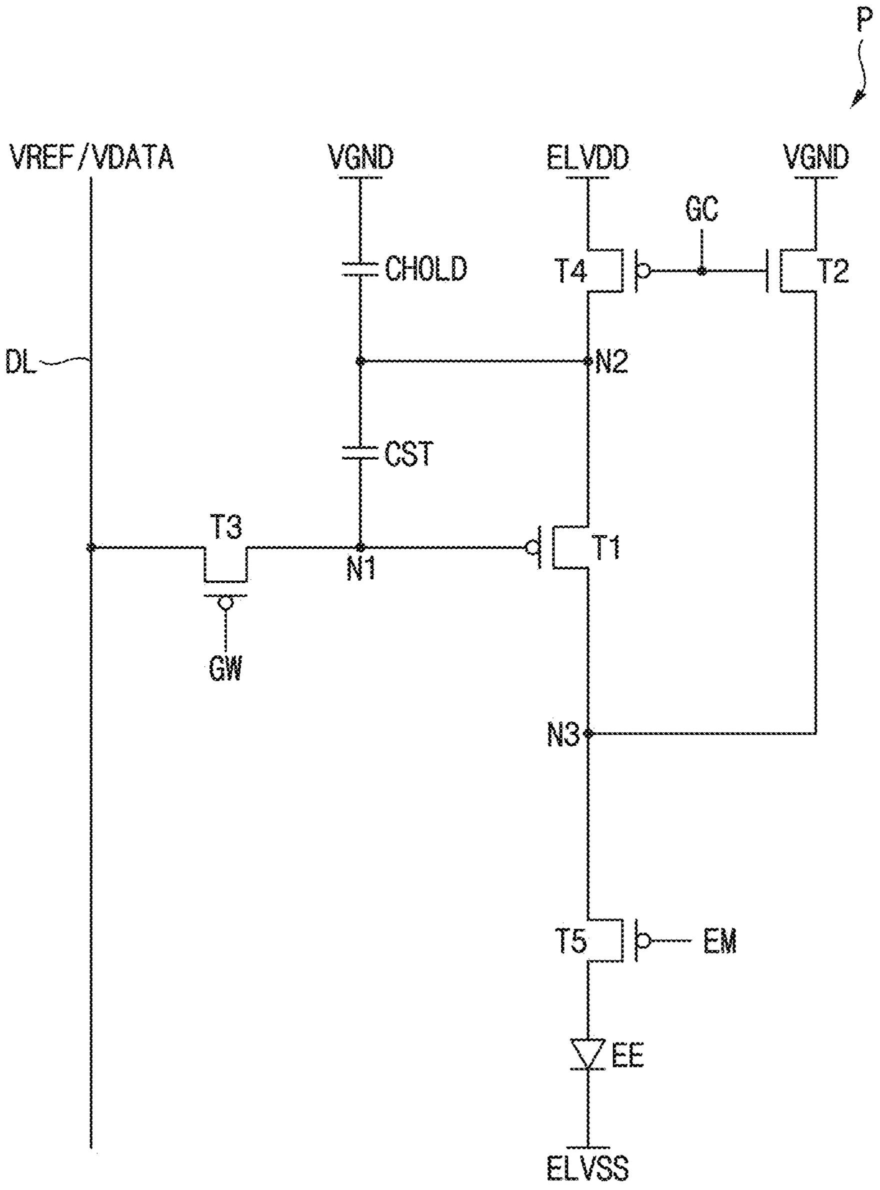
FIG. 2A is a circuit diagram illustrating an example of a pixel circuit of FIG. 1 in accordance with one or more embodiments of the present disclosure.
Figure 2B:
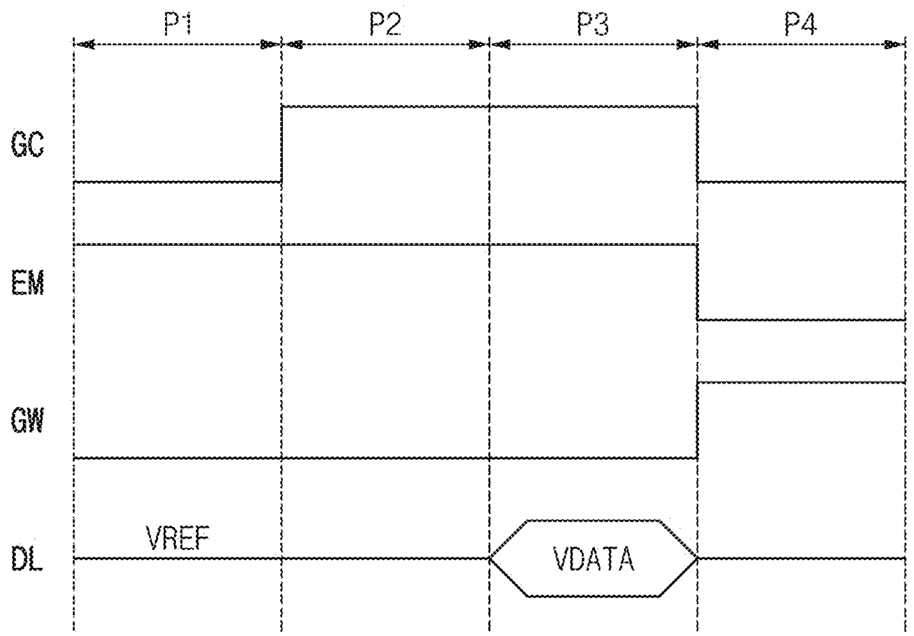
FIG. 2B is a timing diagram illustrating an example of driving the pixel circuit of FIG. 2A.

FIG. 2A is a circuit diagram illustrating an example of the pixel circuit of FIG. 1 in accordance with one or more embodiments of the present disclosure. FIG. 2B is a timing diagram illustrating an example of driving the pixel circuit of FIG. 2A.

Referring to FIGS. 1 to 2B, a pixel circuit P may include a light emitting element EE, a driving transistor T1, a compensation transistor T2, a data write transistor T3, a first light emission control transistor T4, and a storage capacitor CST and a hold capacitor CHOLD. In an embodiment, the pixel circuit P may further include a second light emission control transistor T5.

The light emitting element EE may include an anode electrode and a cathode electrode configured to receive a second power voltage ELVSS.

The driving transistor T1 may include a gate electrode connected to a first node N1, a first electrode connected to a second node N2, and a second electrode connected to a third node N3.

The compensation transistor T2 may include a gate electrode configured to receive a compensation gate signal GC, a first electrode configured to receive a ground voltage VGND, and a second electrode connected to the third node N3.

The data write transistor T3 may include a gate electrode configured to receive a data write gate signal GW, a first electrode connected to a data line DL configured to provide a reference voltage VREF or a data voltage VDATA, and a second electrode connected to the first node N1.

The first light emission control transistor T4 may include a gate electrode configured to receive the compensation gate signal GC, a first electrode configured to receive a first power voltage ELVDD, and a second electrode connected to the second node N2.

The storage capacitor CST may include a first electrode connected to the second node N2 and a second electrode connected to the first node N1.

The hold capacitor CHOLD may include a first electrode configured to receive the ground voltage VGND and a second electrode connected to the second node N2.

The second light emission control transistor T5 may include a gate electrode configured to receive an emission signal EM, a first electrode connected to the third node N3, and a second electrode connected to the anode electrode.

In some cases, leakage current may occur more in a P-type transistor than in an N-type transistor. Therefore, some of transistors included in the pixel circuit P may be N-type transistors, which may reduce the total amount of leakage current at the pixel circuit P. In an embodiment, the compensation transistor T2 may be an N-type transistor, and the first light emission control transistor T4 may be a P-type transistor. In an embodiment, the driving transistor T1 and the data write transistor T3 may be P-type transistors, and the second light emission control transistor T5 may be an N-type transistor. In an embodiment, the compensation transistor T2 and the first light emission control transistor T4 may form a complementary metal-oxide-semiconductor (CMOS). Therefore, embodiments of the pixel circuit P in accordance with one or more embodiments of the present disclosure support a reduced number of gate signals and a reduced number of lines transmitting the gate signals, and accordingly, a reduced area, compared to some other pixel circuits. In an example in which a signal applied to a gate electrode of the P-type transistor has a low voltage level, the P-type transistor may be turned on. In an example in which the signal applied to the gate terminal of the P-type transistor has a high voltage level, the P-type transistor may be turned off. In an example in which a signal applied to a gate electrode of the N-type transistor has the high voltage level, the N-type transistor may be turned on. In an example in which the signal applied to the gate terminal of the N-type transistor has the low voltage level, the N-type transistor may be turned off.

In a first period P1, the compensation gate signal GC and the data write gate signal GW may have the low voltage level, the emission signal EM may have the high voltage level, and the data line DL may provide the reference voltage VREF.

In a second period P2 after the first period P1, the compensation gate signal GC and the emission signal EM may have the high voltage level, the data write gate signal GW may have the low voltage level, and the data line DL may provide the reference voltage VREF.

In a third period P3 after the second period P2, the compensation gate signal GC and the emission signal EM may have the high voltage level and the data write gate signal GW may have the low voltage level, and the data line DL may provide the data voltage VDATA.

In a fourth period P4 after the third period P3, the compensation gate signal GC and the emission signal EM may have the low voltage level, the data write gate signal GW may have the high voltage level, and the data line DL may provide the reference voltage VREF.

The terms "high voltage level" and "low voltage level" are relative terms describing levels of voltages which, when applied to a transistor described herein, activate the transistor (e.g., turn on the transistor) or deactivate the transistor (e.g., turn off the transistor).

It is to be understood that the periods (e.g., first period P1 through fourth period P4, and the like) described herein may be periods of time. In some cases, a respective amount of time associated with a given period (e.g., first period P1) may be equal to or different from a respective amount of time associated with another given period (e.g., second period P2, third period P2, or the like).

Figure 2C:
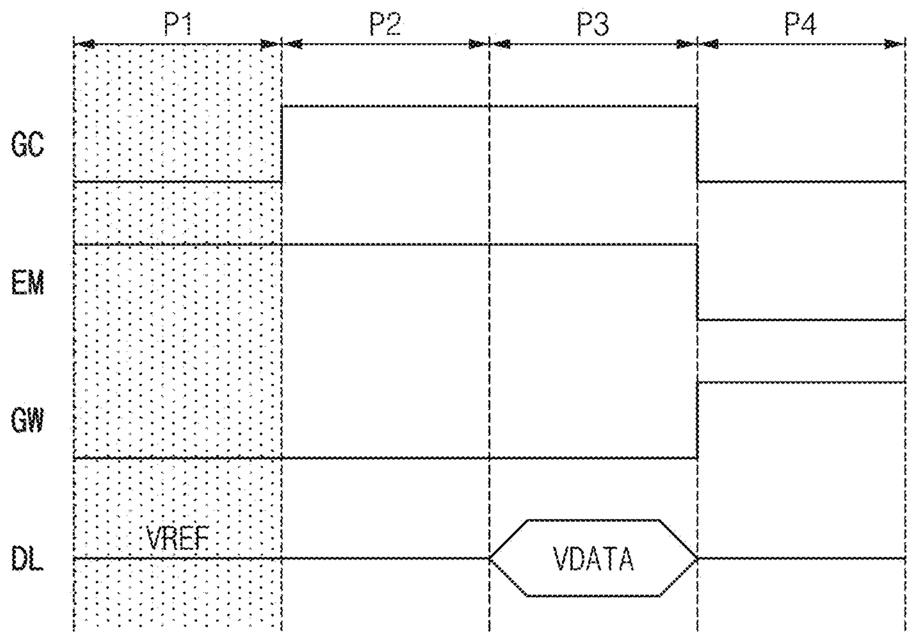
FIG. 2C is a timing diagram illustrating an example of the pixel circuit of FIG. 2A operating in a first period.
Figure 2D:
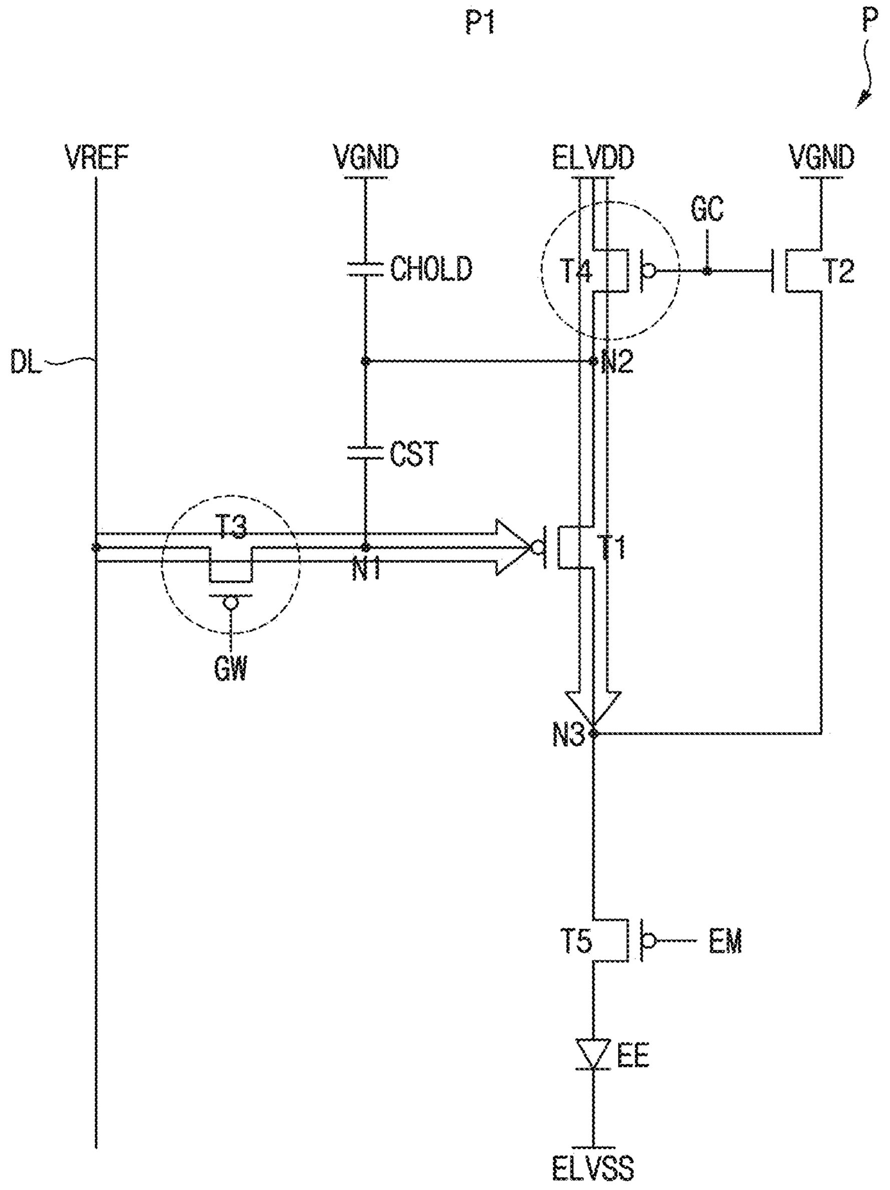
FIG. 2D is a circuit diagram illustrating an example of the pixel circuit of FIG. 2A operating in the first period.

FIG. 2C is a timing diagram illustrating an example of the pixel circuit of FIG. 2A operating in the first period. FIG. 2D is a circuit diagram illustrating an example of the pixel circuit of FIG. 2A operating in the first period.

Referring to FIGS. 1 to 2D, in the first period P1, the data write transistor T3 and the first light emission control transistor T4 may be turned on, and the compensation transistor T2 and the second light emission control transistor T5 may be turned off.

When the data line DL provides the reference voltage VREF and the data write transistor T3 is turned on, the data write transistor T3 may provide the reference voltage VREF to the first node N1 (i.e., the gate electrode of the driving transistor T1). The first node N1 may be initialized to the reference voltage VREF. References to the data line DL providing a described voltage (e.g., reference voltage VREF, data voltage VDATA) include the data driver 500 providing the described voltage via the data line DL.

A path may be formed through the first light emission control transistor T4 and the driving transistor T1. The second node N2 and the third node N3 may be initialized through the path. For example, the second node N2 may be initialized to the first power voltage ELVDD.

Figure 2E:
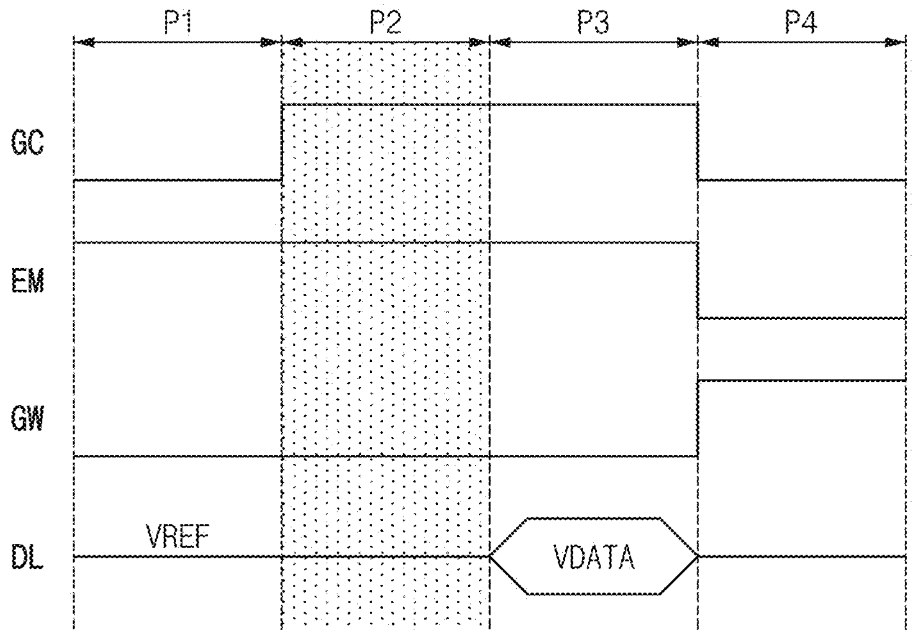
FIG. 2E is a timing diagram illustrating an example of the pixel circuit of FIG. 2A operating in a second period.
Figure 2F:
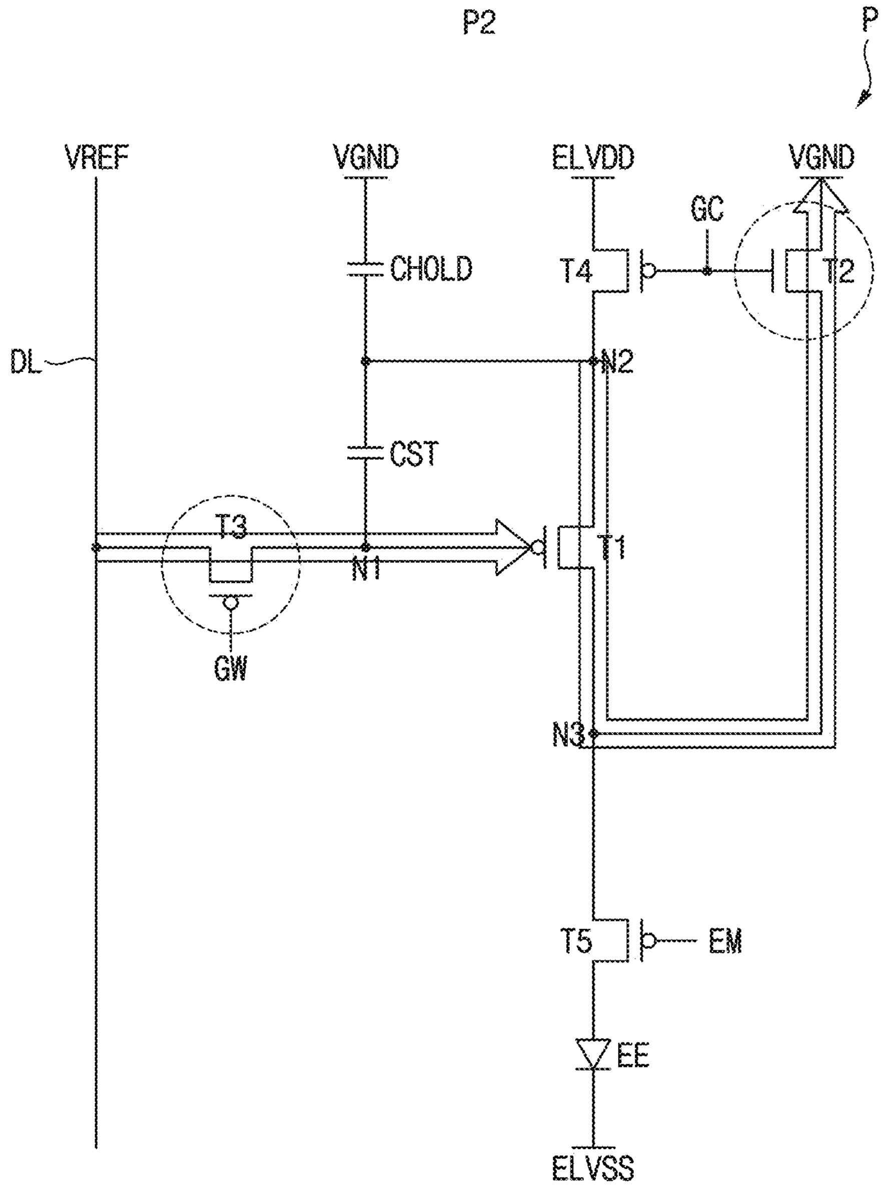
FIG. 2F is a circuit diagram illustrating an example of the pixel circuit of FIG. 2A operating in the second period.

FIG. 2E is a timing diagram illustrating an example of the pixel circuit of FIG. 2A operating in the second period. FIG. 2F is a circuit diagram illustrating an example of the pixel circuit of FIG. 2A operating in the second period.

Referring to FIGS. 1 to 2F, in the second period P2, the compensation transistor T2 and the data write transistor T3 may be turned on, and the first light emission control transistor T4 and the second light emission control transistor T5 may be turned off.

When the data line DL provides the reference voltage VREF and the data write transistor T3 is turned on, the data write transistor T3 may provide the reference voltage VREF to the first node N1.

When the compensation transistor T2 is turned on, a path through the driving transistor T1 and the compensation transistor T2 may be formed, and the driving transistor T1 may operate as a source-follower. In an example in which the driving transistor T1 operates as the source-follower, a voltage at the second node N2 may transition from ELVDD to VREF+VTH. Here, VTH may be a threshold voltage of the driving transistor T1. Therefore, the storage capacitor CST may store the threshold voltage VTH of the driving transistor T1, and accordingly, the threshold voltage VTH of the driving transistor T1 may be compensated.

Figure 2G:
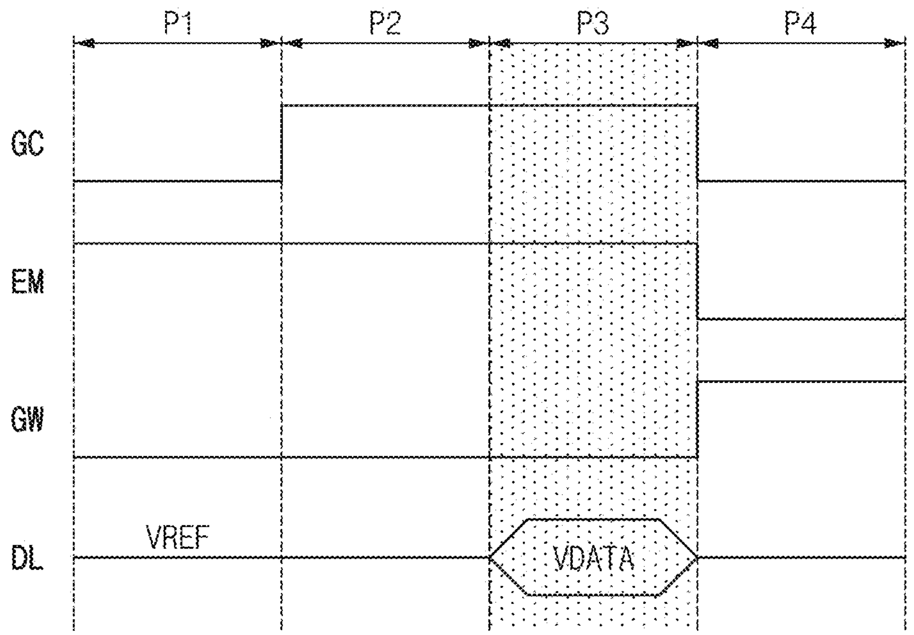
FIG. 2G is a timing diagram illustrating an example of the pixel circuit of FIG. 2A operating in a third period.
Figure 2H:
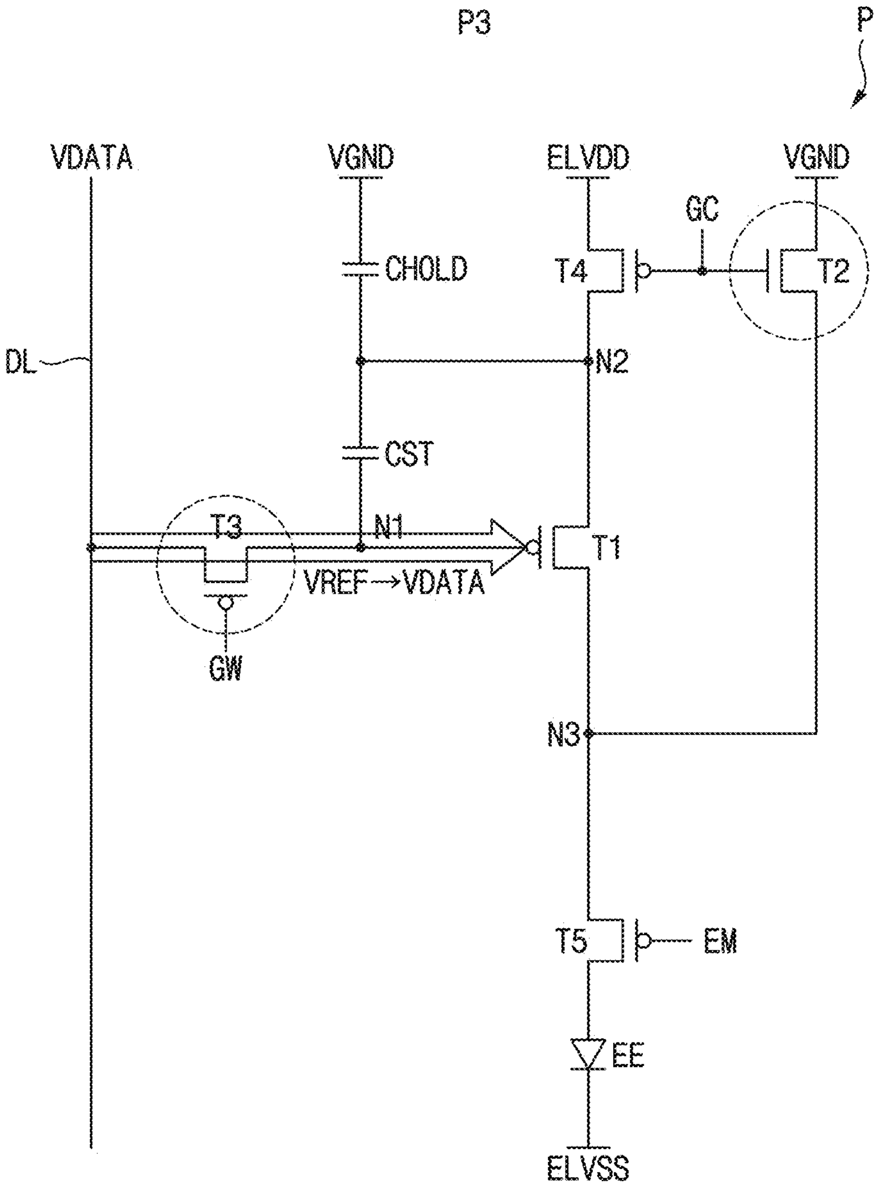
FIG. 2H is a circuit diagram illustrating an example of the pixel circuit of FIG. 2A operating in the third period.

FIG. 2G is a timing diagram illustrating an example of the pixel circuit of FIG. 2A operating in the third period. FIG. 2H is a circuit diagram illustrating an example of the pixel circuit of FIG. 2A operating in the third period.

Referring to FIGS. 1 to 2H, in the third period P3, the compensation transistor T2 and the data write transistor T3 may be turned on, and the first light emission control transistor T4 and the second light emission control transistor T5 may be turned off.

When the data line DL provides the data voltage VDATA and the data write transistor T3 is turned on, the data write transistor T3 may provide the data voltage VDATA to the first node N1.

A voltage at the first node N1 may transition from the reference voltage VREF to the data voltage VDATA. Therefore, the voltage at the second node N2 (i.e., the voltage at the first electrode of the driving transistor T1) may be boosted by the storage capacitor CST. In some embodiments, the voltage at the second node N2 (that is, the voltage at the gate electrode of the driving transistor T1) may be distributed by the storage capacitor CST and the hold capacitor CHOLD. A driving current of the driving transistor T1 may be determined based on a gate-source voltage of the driving transistor T1. Since the voltage at the second node N2 is distributed by the storage capacitor CST and the hold capacitor CHOLD, even for cases in which the data voltage VDATA increases, a resultant degree of an increase in the gate-source voltage of the driving transistor T1 may be small. Therefore, embodiments of the pixel circuit P may support an expanded data range of the data voltage VDATA.

In some embodiments, since the second light emission control transistor T5 is turned off in the first period P1 through the third period P3, light emission by the light emitting element EE due to leakage current flowing to the light emitting element EE may be prevented.

Figure 2I:
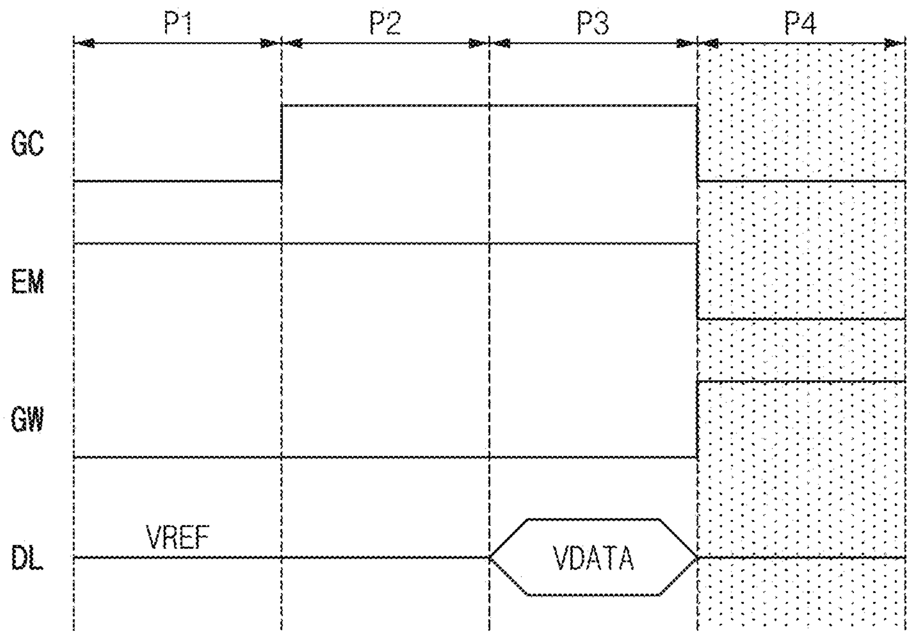
FIG. 2I is a timing diagram illustrating an example of the pixel circuit of FIG. 2A operating in a fourth period.
Figure 2J:
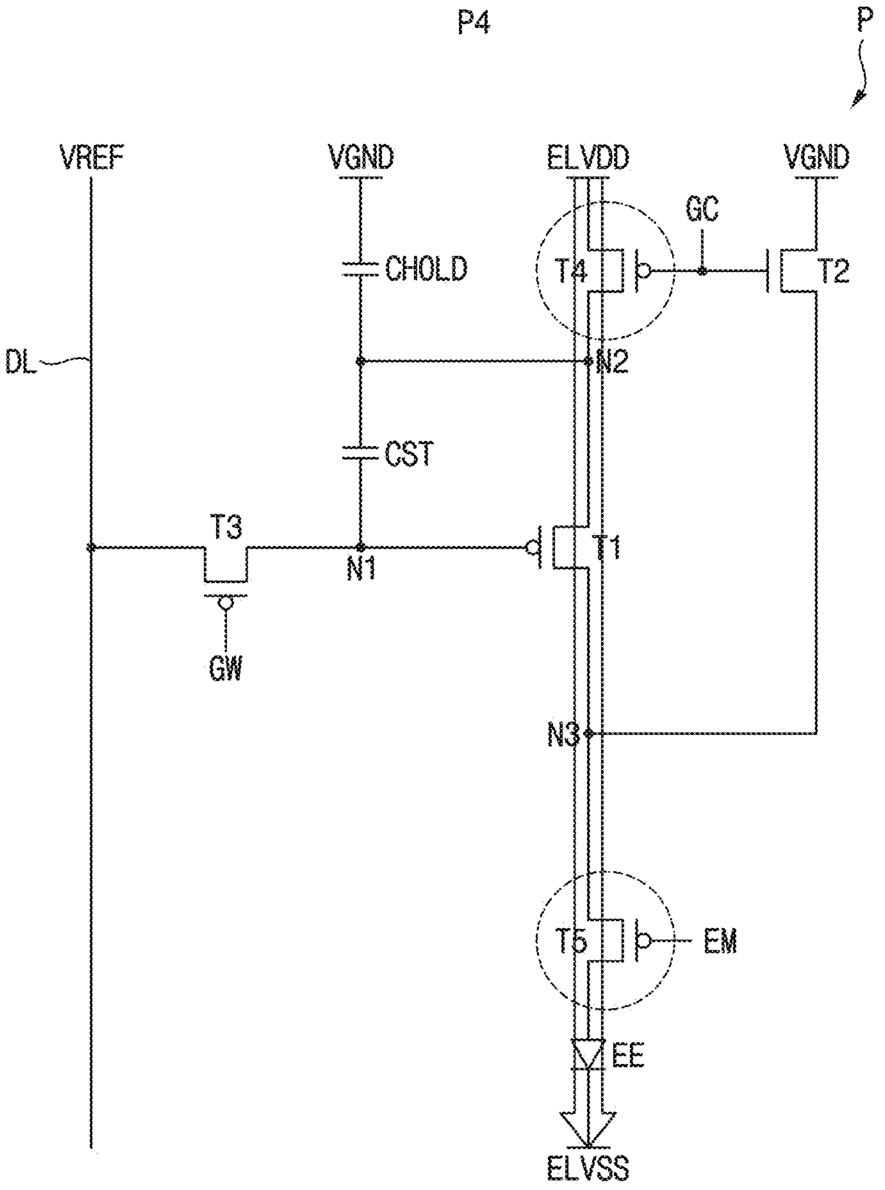
FIG. 2J is a circuit diagram illustrating an example of the pixel circuit of FIG. 2A operating in the fourth period.

FIG. 2I is a timing diagram illustrating an example of the pixel circuit of FIG. 2A operating in the fourth period. FIG. 2J is a circuit diagram illustrating an example of the pixel circuit of FIG. 2A operating in the fourth period.

Referring to FIGS. 1 to 2J, in the fourth period P4, the first light emission control transistor T4 and the second light emission control transistor T5 may be turned on, and the compensation transistor T2 and the data write transistor T3 may be turned off.

The voltage at the first node N1 may be determined based on the data voltage VDATA, the driving current of the driving transistor T1 may be determined based on the voltage at the first node N1 and the voltage at the second node N2, and the driving transistor T1 may provide the driving current to the light emitting element EE. The light emitting element EE may emit light with a luminance corresponding to the driving current.

As such, since some of the transistors included in the pixel circuit P are N-type transistors, the leakage current of the pixel circuit P may be minimized. Since the compensation transistor T2 and the first light emission control transistor T4 form a CMOS transistor, the area of the pixel circuit P may be reduced. Since the driving transistor T1 operates as the source-follower, the threshold voltage of the driving transistor T1 may be compensated. Since the voltage at the first electrode of the driving transistor T1 is distributed by the storage capacitor CST and the hold capacitor CHOLD, embodiments of the present disclosure may support an expanded data range. Since the second light emission control transistor T5 is turned off in a non-emission period excluding a light emission period, light emission by the light emitting element EE due to leakage current flowing into the light emitting element EE may be prevented.

Figure 3A:
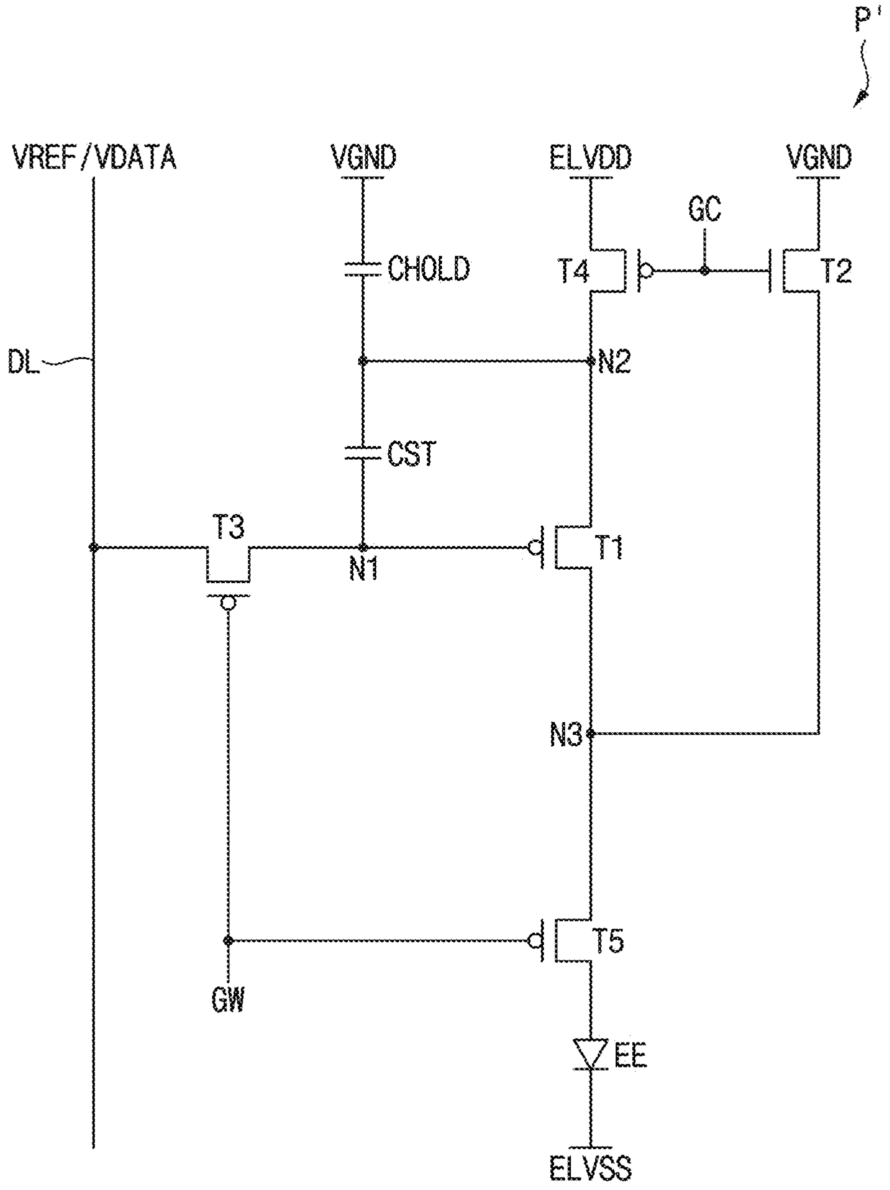
FIG. 3A is a circuit diagram illustrating an example of the pixel circuit of FIG. 1 in accordance with one or more embodiments of the present disclosure.
Figure 3B:
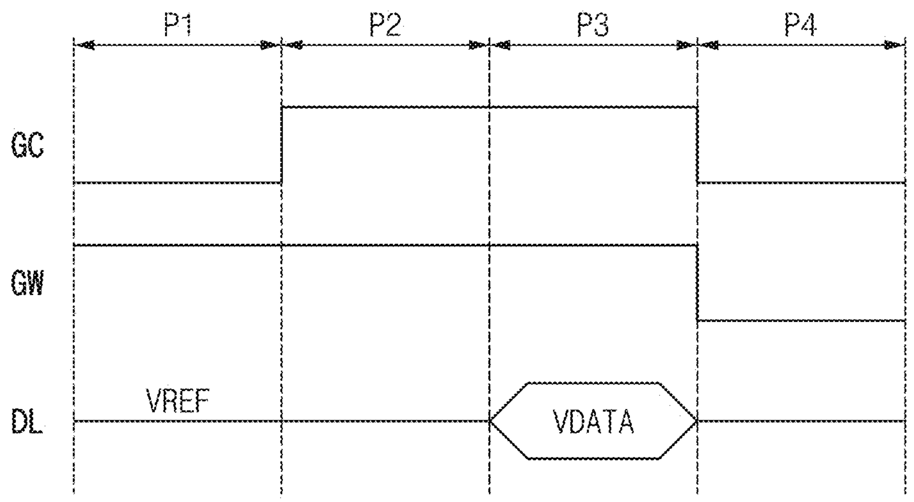
FIG. 3B is a timing diagram illustrating an example of operating the pixel circuit of FIG. 3A.
Figure 3C:
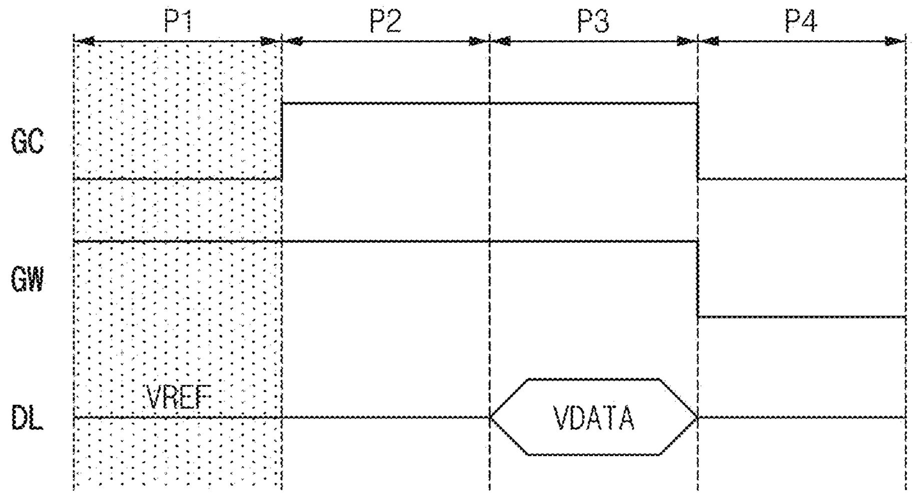
FIG. 3C is a timing diagram illustrating an example of the pixel circuit of FIG. 3A operating in a first period.
Figure 3D:
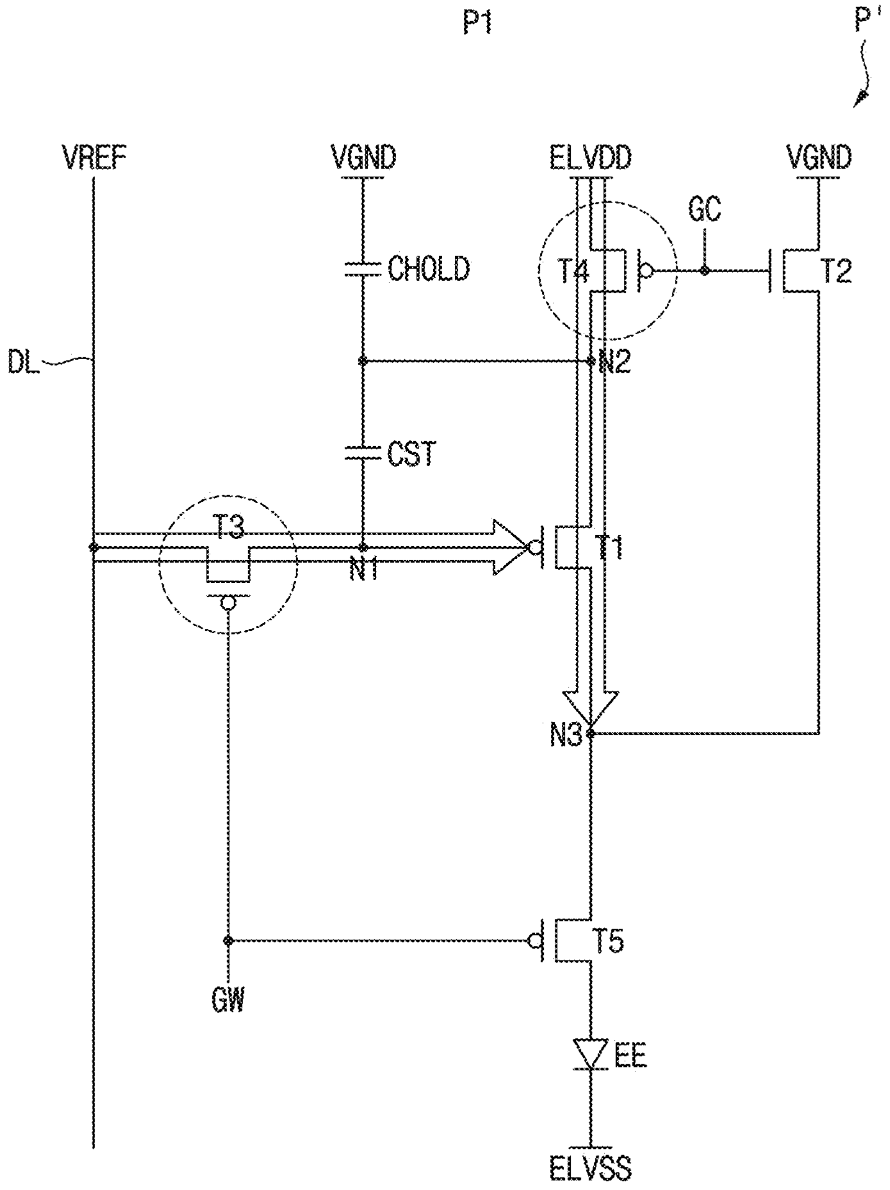
FIG. 3D is a circuit diagram illustrating an example of the pixel circuit of FIG. 3A operating in the first period.
Figure 3E:
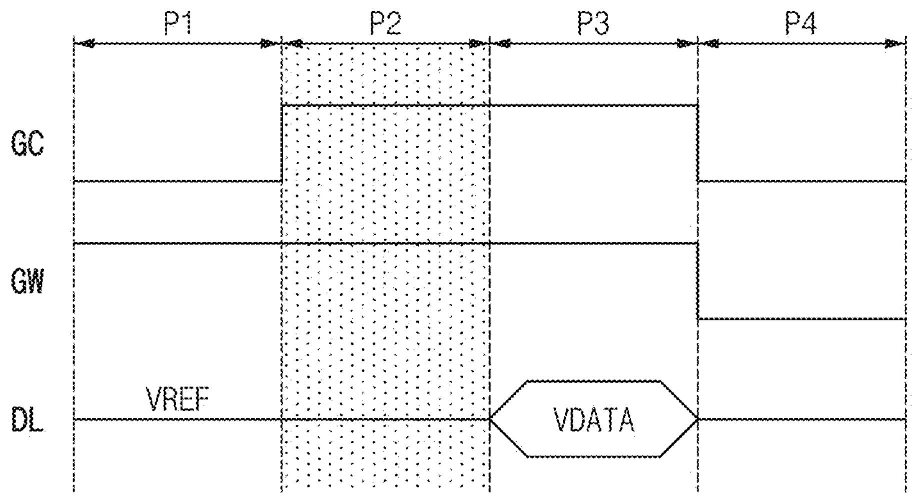
FIG. 3E is a timing diagram illustrating an example of the pixel circuit of FIG. 3A operating in a second period.
Figure 3F:
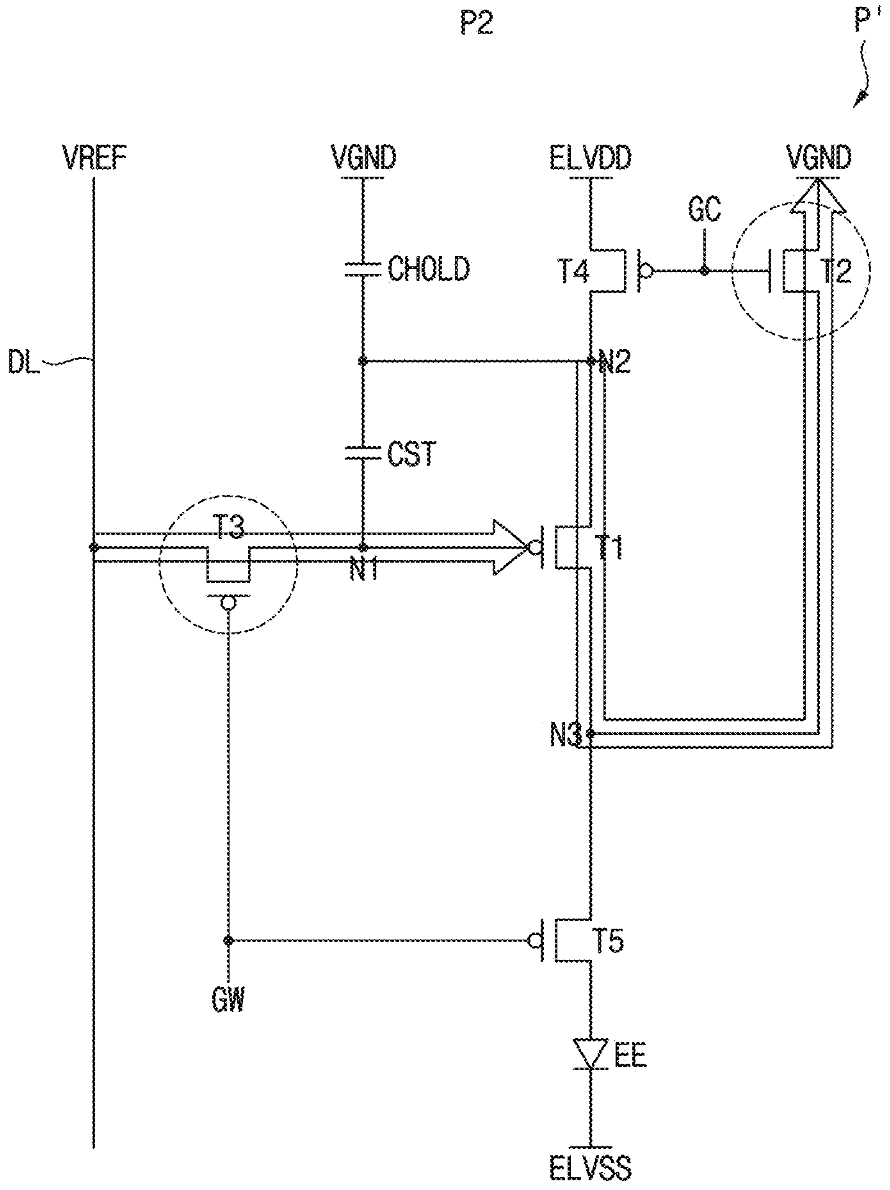
FIG. 3F is a circuit diagram illustrating an example of the pixel circuit of FIG. 3A operating in the second period.
Figure 3G:
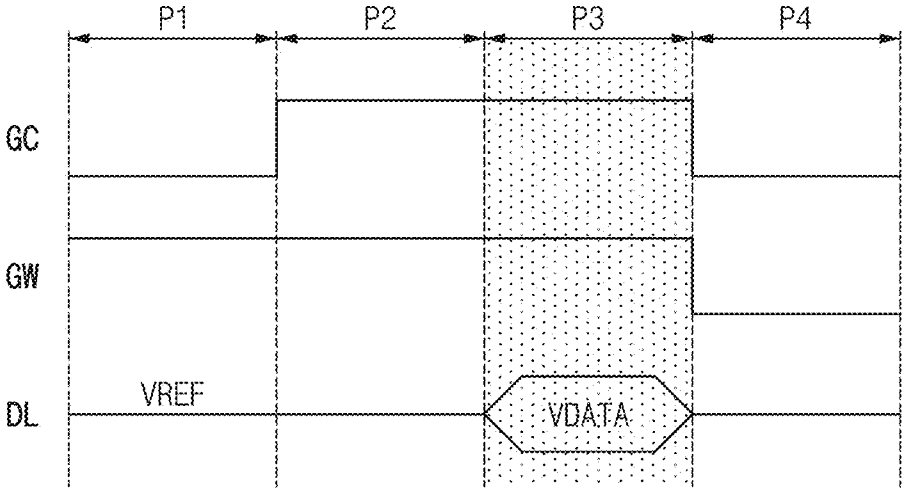
FIG. 3G is a timing diagram illustrating an example of the pixel circuit of FIG. 3A operating in a third period.
Figure 3H:
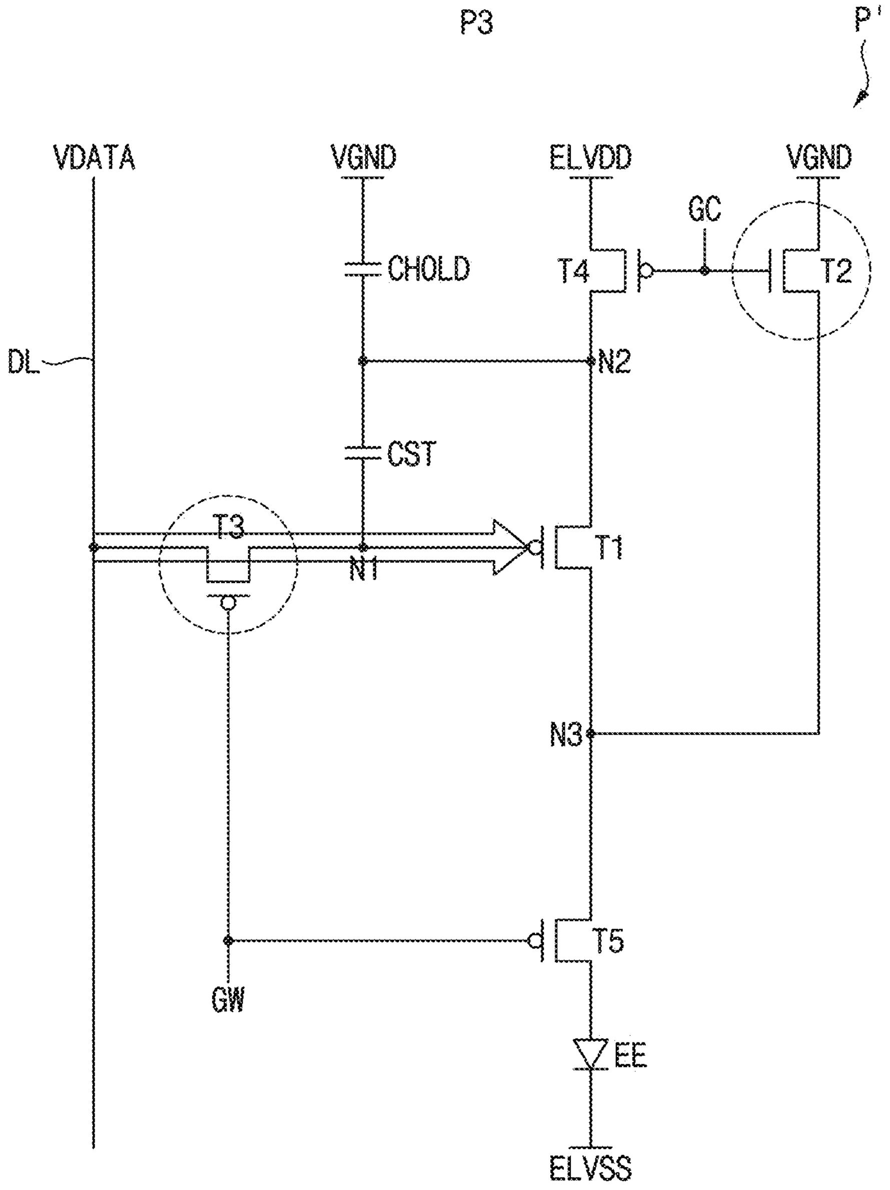
FIG. 3H is a circuit diagram illustrating an example of the pixel circuit of FIG. 3A operating in the third period.
Figure 3I:
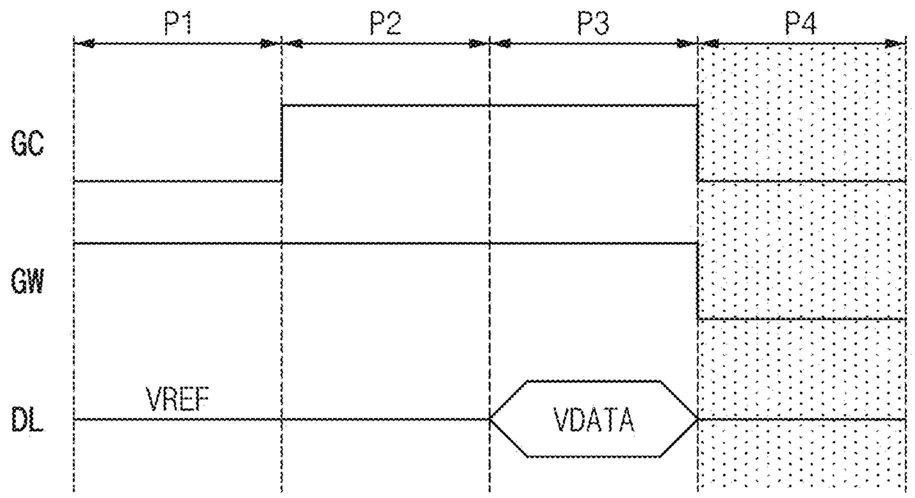
FIG. 3I is a timing diagram illustrating an example of the pixel circuit of FIG. 3A operating in a fourth period.
Figure 3J:
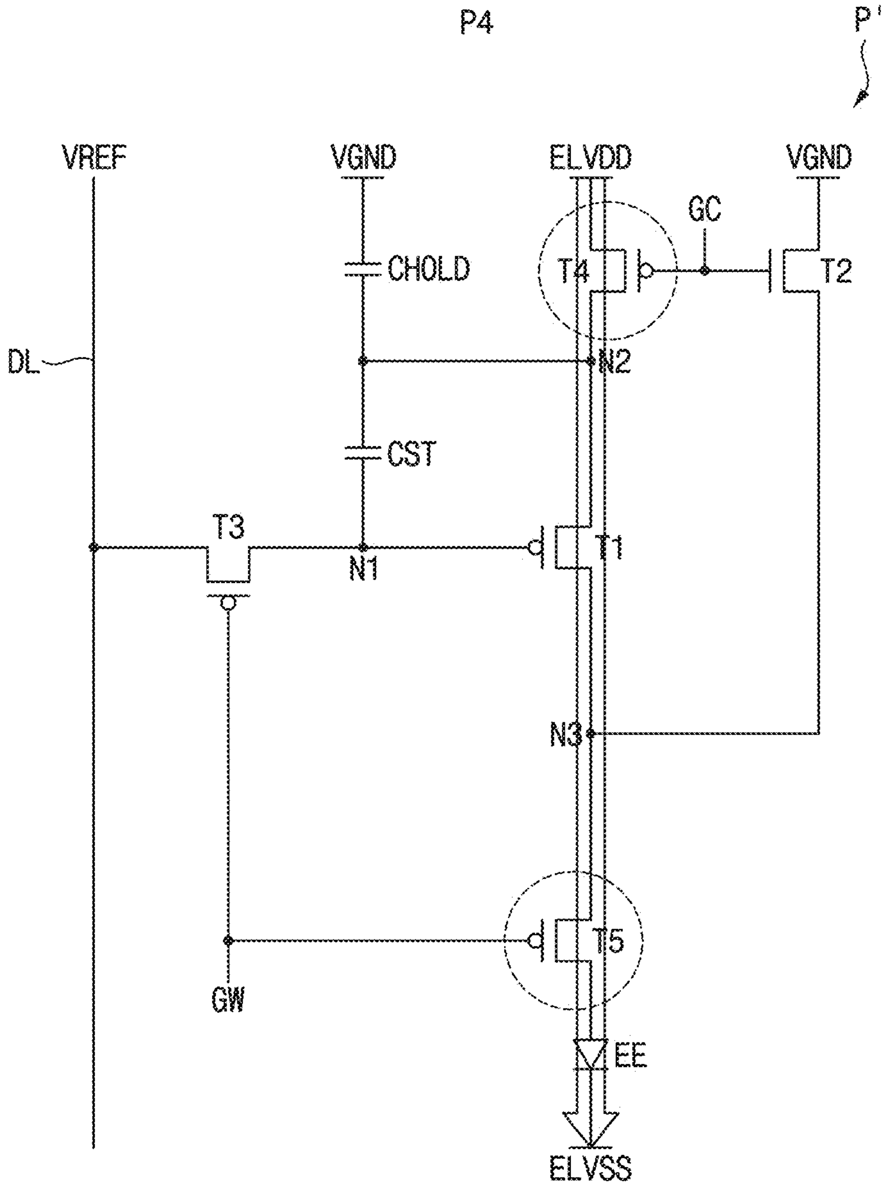
FIG. 3J is a circuit diagram illustrating an example of the pixel circuit of FIG. 3A operating in the fourth period.

FIG. 3A is a circuit diagram illustrating an example of the pixel circuit of FIG. 1 in accordance with one or more embodiments of the present disclosure. FIG. 3B is a timing diagram illustrating an example of operating the pixel circuit of FIG. 3A. FIG. 3C is a timing diagram illustrating an example of the pixel circuit of FIG. 3A operating in a first period. FIG. 3D is a circuit diagram illustrating an example of the pixel circuit of FIG. 3A operating in the first period. FIG. 3E is a timing diagram illustrating an example of the pixel circuit of FIG. 3A operating in a second period. FIG. 3F is a circuit diagram illustrating an example of the pixel circuit of FIG. 3A operating in the second period. FIG. 3G is a timing diagram illustrating an example of the pixel circuit of FIG. 3A operating in a third period. FIG. 3H is a circuit diagram illustrating an example of the pixel circuit of FIG. 3A operating in the third period. FIG. 3I is a timing diagram illustrating an example of the pixel circuit of FIG. 3A operating in a fourth period. FIG. 3J is a circuit diagram illustrating an example of the pixel circuit of FIG. 3A operating in the fourth period.

The pixel circuit P' of FIG. 3A may include aspects of the pixel circuit P described with reference to FIG. 2A, and repeated descriptions of like elements may be omitted for brevity. Referring to FIGS. 1 to 3J, the pixel circuit P' of FIG. 3A is substantially identical to the pixel circuit P of FIG. 2A except that a gate electrode of a data write transistor T3 and a gate electrode of a second light emission control transistor T5 are configured to commonly receive a data write gate signal GW, a data write transistor T3 is an N-type transistor, a second light emission control transistor T5 is a P-type transistor, and the data writing transistor T3 and the second light emission control transistor T5 form a CMOS transistor. Since the data write transistor T3 and the second light emission control transistor T5 form the CMOS transistor in the pixel circuit P' of FIG. 3A, an area of the pixel circuit P' of FIG. 3A may be further reduced compared to the area of the pixel circuit P of FIG. 2A.

Since the gate electrode of the data write transistor T3 and the gate electrode of the second light emission control transistor T5 commonly receive the data write gate signal GW, example operations of the pixel circuit P' of FIG. 3A may be implemented without the emission signal EM described with reference to the pixel circuit P of FIG. 2A. For example, the timing diagram of FIG. 3B omits a timing diagram of the emission signal EM, unlike the timing diagram of FIG. 2B. However, the phase of the data write gate signal GW may be opposite to a phase of the emission signal EM. Accordingly, an operation of the pixel circuit P' of FIG. 3A in FIGS. 3C to 3J may be substantially equal to the operation of the pixel circuit P of FIG. 2A in FIGS. 2C to 2J. Therefore, redundant description of the pixel circuit P' of FIG. 3A will be omitted.

Figure 4:
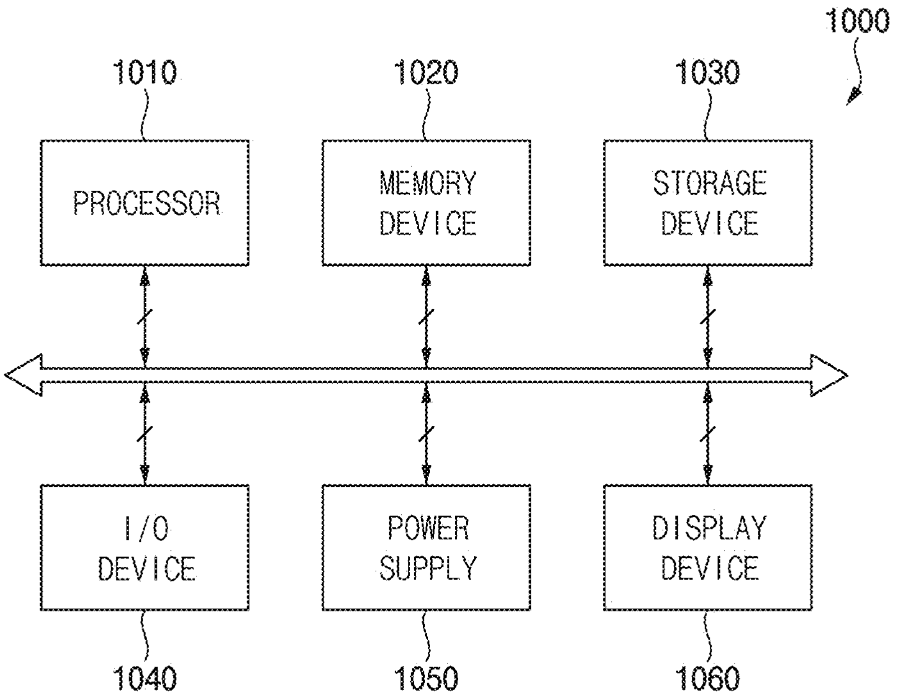
FIG. 4 is a block diagram illustrating an electronic device.
Figure 5:
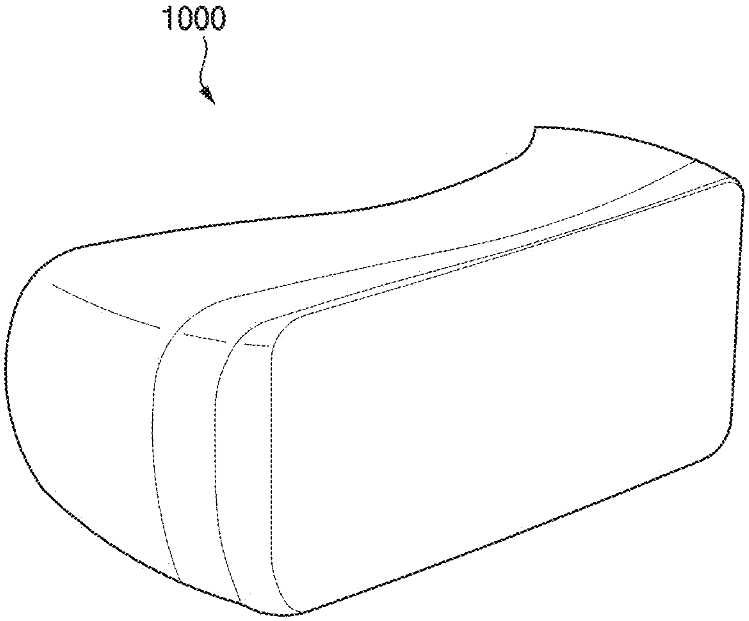
FIG. 5 is a diagram illustrating an embodiment in which the electronic device of FIG. 4 is implemented as a VR device.

FIG. 4 is a block diagram illustrating an electronic device. FIG. 5 is a diagram illustrating an embodiment in which the electronic device of FIG. 4 is implemented as a VR device.

Referring to FIGS. 4 and 5, the electronic device 1000 may include a processor 1010, a memory device 1020, a storage device 1030, an input/output (I/O) device 1040, a power supply 1050, and a display device 1060. The display device 1060 may be the display device 10 of FIG. 1. In some aspects, the electronic device 1000 may further include a plurality of ports for communicating with a video card, a sound card, a memory card, a universal serial bus (USB) device, another electronic device, and the like.

In an embodiment, as illustrated in FIG. 5, the electronic device 1000 may be implemented as a VR device. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a microprocessor, a central processing unit (CPU), an application processor (AP), and the like. The processor 1010 may be coupled to other components via an address bus, a control bus, a data bus, and the like. Further, the processor 1010 may be coupled to an extended bus such as, for example, a peripheral component interconnection (PCI) bus. The term "coupled" herein may refer to an electrical coupling or an electrical connection. The term "coupled" may refer to a physical connection supportive of the electrical coupling or electrical connection.

The memory device 1020 may store data for operations of the electronic device 1000. For example, the memory device 1020 may include at least one non-volatile memory device such as, for example, an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as, for example, a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as, for example, a keyboard, a keypad, a mouse device, a touch-pad, a touch-screen, and the like, and an output device such as, for example, a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, or the like.

The foregoing is illustrative embodiments supported by the present disclosure and is not to be construed as limiting thereof. Although example embodiments supported by aspects of the present disclosure have been described, those skilled in the art will readily appreciate that many modifications are possible in the embodiments without materially departing from the novel teachings and advantages of embodiments of the present disclosure as described herein. Accordingly, all such modifications are intended to be included within the scope the example embodiments and aspects supported by aspects of the present disclosure as defined in the claims. In the claims, means-plus-function clauses are intended to cover the structures described herein as performing the recited function and not only structural equivalents but also equivalent structures. Therefore, it is to be understood that the foregoing is illustrative of example embodiments supported by the present disclosure and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A pixel circuit comprising:

a light emitting element comprising an anode electrode and a cathode electrode, wherein the cathode electrode is configured to receive a second power voltage;

a driving transistor comprising a gate electrode connected to a first node, a first electrode connected to a second node, and a second electrode connected to a third node;

a compensation transistor comprising a gate electrode configured to receive a compensation gate signal, a first electrode configured to receive a ground voltage, and a second electrode connected to the third node;

a data write transistor comprising a gate electrode configured to receive a data write gate signal, a first electrode connected to a data line configured to provide a reference voltage or a data voltage, and a second electrode connected to the first node;

a first light emission control transistor comprising a gate electrode configured to receive the compensation gate signal, a first electrode configured to receive a first power voltage, and a second electrode connected to the second node;

a storage capacitor comprising a first electrode connected to the second node and a second electrode connected to the first node; and a hold capacitor comprising a first electrode configured to receive the ground voltage and a second electrode connected to the second node.

2. The pixel circuit of claim 1, wherein the compensation transistor is an N-type transistor and the first light emission control transistor is a P-type transistor.

3. The pixel circuit of claim 2, wherein the compensation transistor and the first light emission control transistor form a complementary metal-oxide-semiconductor (CMOS) transistor.

4. The pixel circuit of claim 1, further comprising:

a second light emission control transistor comprising a gate electrode configured to receive an emission signal, a first electrode connected to the third node, and a second electrode connected to the anode electrode.

5. The pixel circuit of claim 4, wherein the driving transistor and the data write transistor are P-type transistors, and the second light emission control transistor is an N-type transistor.

6. The pixel circuit of claim 4, wherein, in a first period, the compensation gate signal and the data write gate signal have a low voltage level, the emission signal has a high voltage level, and the data line is configured to provide the reference voltage.

7. The pixel circuit of claim 6, wherein, in the first period, the data write transistor is configured to provide the reference voltage to the gate electrode of the driving transistor.

8. The pixel circuit of claim 6, wherein, in a second period after the first period, the compensation gate signal and the emission signal have the high voltage level, the data write gate signal has the low voltage level, and the data line is configured to provide the reference voltage.

9. The pixel circuit of claim 8, wherein, in the second period, the compensation transistor is turned on, and the storage capacitor stores a threshold voltage of the driving transistor.

10. The pixel circuit of claim 8, wherein, in a third period after the second period, the compensation gate signal and the emission signal have the high voltage level, the data write gate signal has the low voltage level, and the data line is configured to provide the data voltage.

11. The pixel circuit of claim 10, wherein, in the third period, the data write transistor is configured to provide the data voltage to the gate electrode of the driving transistor.

12. The pixel circuit of claim 10, wherein, in the third period, the storage capacitor and the hold capacitor distribute a voltage of the gate electrode of the driving transistor.

13. The pixel circuit of claim 10, wherein, in a fourth period after the third period, the compensation gate signal and the emission signal have the low voltage level, the data write gate signal has the high voltage level, and the data line is configured to provide the reference voltage.

14. The pixel circuit of claim 13, wherein, in the fourth period, a driving current of the driving transistor flows to the light emitting element.

15. The pixel circuit of claim 1, further comprising:

a second light emission control transistor comprising a gate electrode configured to receive the data write gate signal, a first electrode connected to the third node, and a second electrode connected to the anode electrode.

16. The pixel circuit of claim 15, wherein the data write transistor is an N-type transistor and the second light emission control transistor is a P-type transistor.

17. The pixel circuit of claim 16, wherein the data write transistor and the second light emission control transistor form a CMOS transistor.

18. A display device comprising:

a display panel comprising a pixel circuit; and a display panel driver configured to drive the display panel, wherein the pixel circuit comprises:

a light emitting element comprising an anode electrode and a cathode electrode, wherein the cathode electrode is configured to receive a second power voltage;

a driving transistor comprising a gate electrode connected to a first node, a first electrode connected to a second node, and a second electrode connected to a third node;

a compensation transistor comprising a gate electrode configured to receive a compensation gate signal, a first electrode configured to receive a ground voltage, and a second electrode connected to the third node;

a data write transistor comprising a gate electrode configured to receive a data write gate signal, a first electrode connected to a data line configured to provide a reference voltage or a data voltage, and a second electrode connected to the first node;

a first light emission control transistor comprising a gate electrode configured to receive the compensation gate signal, a first electrode configured to receive a first power voltage, and a second electrode connected to the second node;

a storage capacitor comprising a first electrode connected to the second node and a second electrode connected to the first node; and a hold capacitor comprising a first electrode configured to receive the ground voltage and a second electrode connected to the second node.

19. The display device of claim 18, wherein the pixel circuit further comprises:

a second light emission control transistor comprising a gate electrode configured to receive an emission signal, a first electrode connected to the third node, and a second electrode connected to the anode electrode.

20. The display device of claim 18, wherein the pixel circuit further comprises:

a second light emission control transistor comprising a gate electrode configured to receive the data write gate signal, a first electrode connected to the third node, and a second electrode connected to the anode electrode.

* * * * *